US008607891B2

(12) United States Patent
Kondo

(10) Patent No.: US 8,607,891 B2
(45) Date of Patent: Dec. 17, 2013

(54) ELECTRICAL POWER TOOL

(75) Inventor: Takayoshi Kondo, Anjo (JP)

(73) Assignee: Makita Corporation, Anjo-shi (JP)

( * ) Notice: Subject to any disclaimer, the term of this patent is extended or adjusted under 35 U.S.C. 154(b) by 281 days.

(21) Appl. No.: 13/059,575

(22) PCT Filed: Aug. 7, 2009

(86) PCT No.: PCT/JP2009/064027
§ 371 (c)(1), (2), (4) Date: Apr. 6, 2011

(87) PCT Pub. No.: WO2010/021252
PCT Pub. Date: Feb. 25, 2010

(65) Prior Publication Data

US 2011/0180290 A1 Jul. 28, 2011

(30) Foreign Application Priority Data

Aug. 21, 2008 (JP) ................................ 2008-212793

(51) Int. Cl.
*B23Q 5/28* (2006.01)

(52) U.S. Cl.
USPC .......................................... 173/176; 173/178

(58) Field of Classification Search
USPC ......... 173/1, 11, 12, 109, 163, 176, 179, 178, 173/217, 216
See application file for complete search history.

(56) References Cited

U.S. PATENT DOCUMENTS

| | | | | | |
|---|---|---|---|---|---|
| 4,930,583 | A | * | 6/1990 | Fushiya et al. | 173/109 |
| 5,083,620 | A | * | 1/1992 | Fushiya et al. | 173/217 |
| 5,089,738 | A | | 2/1992 | Bergqvist et al. | |
| 6,139,359 | A | * | 10/2000 | Fuhreck et al. | 439/500 |
| 7,410,006 | B2 | * | 8/2008 | Zhang et al. | 173/1 |
| 2003/0094294 | A1 | | 5/2003 | Fritz | |

FOREIGN PATENT DOCUMENTS

| | | |
|---|---|---|
| JP | A-04-217473 | 8/1992 |
| JP | B2-3289958 | 6/2002 |
| JP | A-2003-145449 | 5/2003 |
| JP | A-2008-270007 | 11/2008 |

OTHER PUBLICATIONS

International Search Report issued in Application No. PCT/JP2009/064027; Dated Nov. 2, 2009 (With Translation).

* cited by examiner

*Primary Examiner* — Alexandra Elve
*Assistant Examiner* — Nathaniel Chukwurah
(74) *Attorney, Agent, or Firm* — Oliff and Berridge, PLC

(57) ABSTRACT

An electrical power tool may include an electric motor, a speed change device, and a battery pack. The speed change device is capable of changing a reduction ratio thereof and capable of automatically switching between a high speed low torque mode in which a high speed low torque is output and a low speed high torque mode in which a low speed high torque is output, based on an external torque applied to a spindle. A distance from the axis to a center of gravity of the battery pack and a mass of the battery pack are set such that an inertia moment around the axis is greater than a reaction around the axis that is produced when the high speed low torque mode is changed to the low speed high torque mode in the speed change device.

3 Claims, 12 Drawing Sheets

ELECTRICAL POWER TOOL

TECHNICAL FIELD

The present invention relates to an electrical power tool such as, for example, an electric screwdriver and a screw tightening machine, which mainly outputs rotative power.

BACKGROUND ART

In general, this type of electrical power tool includes a structure in which rotative power of an electric motor as a drive source is decelerated by a speed change device to output a necessary rotation torque. In many cases, a planetary gear train is used as the speed change device.

For example, in the screw tightening machine, a low torque is sufficient at the beginning of tightening, but a higher rotation torque is gradually needed as a tightening operation progresses. Therefore, a function that is required from the point of view of carrying out a quick and reliable screw tightening is to reduce a reduction ratio of the speed change device so as to output a high speed low torque at the beginning of the tightening operation, and to increase the reduction ratio of the speed change device so as to output a low speed high torque in the middle of the tightening operation. Moreover, in terms of usability, it is required that, in the middle of the tightening operation, the reduction ratio (an output torque) is automatically switched at a point in which a tightening resistance (an external torque) applied to an output shaft reaches a certain value.

Japanese Patent No. 3289958 teaches a screw tightening machine in which a speed change device having two-stage planetary gear trains is interposed between an output shaft of an electric motor and an output shaft provided with a screw tightening bit. According to the speed change device of this conventional screw tightening machine, at the beginning of a screw tightening operation, a carrier of a first stage planetary gear and a carrier of a second stage planetary gear are directly connected via an internal gear of the second stage planetary gear train. As a result, a high speed low torque is output, so that a quick screw tightening operation can be performed. When a user increases a pushing force applied to the screw tightening machine as the screw tightening operation is proceeded, the internal gear of the second stage planetary gear train is relatively displaced in an axial direction, so as to be separated from the carrier of the first stage planetary gear train, while rotation thereof is fixed, thereby causing a deceleration in the second stage planetary gear. As a result, a reduction ratio of the speed change device can be increased, so as to output a low speed high torque. Thus, a reliable screw tightening operation can be performed.

DISCLOSURE OF THE INVENTION

Problem to be Solved by the Invention

However, according to the above-described conventional speed change device, when the user switches the output torque from a high speed low torque side to a low speed high torque side by strongly pressing an electrical power tool, a force (a swing force) to rotate the electrical power tool about an axis (about a driver bit) is generated. As a result, a user's hand which grips a handle portion is swung around the axis. Therefore, in order to prevent this, the user is required to maintain a posture of the electrical power tool with a large force. Thus, usability (operability) of the electrical power tool is impaired in this regard.

Thus, there is a need in the art to provide an improved speed change device and electrical power tool having such an improved speed change device.

SUMMARY OF THE INVENTION

According to one aspect of the present invention, for example, when a screw tightening operation is performed using the electrical power tool, because an external torque (a screw tightening resistance) exerted on a spindle is small in an initial stage of the screw tightening operation, the speed change device is operated in the high speed low torque mode, so that the screw tightening operation can be performed quickly. Thereafter, when the thread fastening progressed and the external torque is increased and reaches a certain value which is previously determined, the speed change device is automatically switched from the high speed low torque mode to the low speed high torque mode. Upon automatic switching of the speed change device to the low speed high torque mode, the screw tightening operation can be completed without producing an incomplete tightening.

Thus, when the external torque reaches the certain value, the high speed low torque mode having a small reduction ratio can be switched to the low speed high torque mode having a large reduction ratio. At this time, a reaction (a swing force) causing the tool main body to rotate around the axis can be produced. Due to the swing force, a user's hand gripping the handle portion can be swung around the axis J together with the handle portion. The greater a change between the reduction ratio in the high speed low torque mode and the reduction ratio in the low speed high torque mode, the larger the swing force. Therefore, the user's hand gripping the handle portion is likely to be swung around the axis (the user's hand is likely to be jerked around the axis J).

However, according to the aspect, the distance L from the axis J to the center of gravity G of the battery pack and the mass M of the battery pack are set such that the inertia moment I around the axis J of the electrical power tool is greater than the swing force around the axis J that is produced when the high speed low torque mode is automatically changed to the low speed high torque mode in the speed change device. Therefore, the electrical power tool can be prevented from being swung around the axis by the reaction that can be generated by an automatic speed change. Consequently, it is sufficient that the user continues to grip the handle portion with a small force even when the speed is changed. Thus, operability of the electrical power tool can be increased.

In the aspect, an output rotation speed in the high speed low torque mode can be set such that an output torque in the high speed low torque mode is smaller than an output torque that is required to complete the operation. According to the output rotation speed thus set, for example, when the screw tightening operation is performed using the electrical power tool, the screw tightening operation can be further quickly and reliably performed. That is, the output torque in the high speed low torque mode in the initial stage of the screw tightening operation can be set to an output torque smaller than the output torque that is required to complete the screw tightening operation, so that the output rotation speed therefor can be set to a sufficiently high speed. Conversely, the output rotation speed in the low speed high torque mode after the automatic speed change can be sufficiently reduced, so that the output torque obtained thereby can be sufficiently increased. As a result, in the initial stage of the screw tightening operation, the screw tightening operation can be performed at a higher speed than in the related art. In addition, the screw tightening operation can be reliably performed without producing the incomplete tightening.

In this case, since the ratio between the output rotation speed before the automatic speed change and the output rotation speed after the automatic speed change is increased, a reaction (a swing force) further greater than in a normal state can be generated during the automatic speed change. However, because the distance L from the axis J to the center of gravity G of the battery pack and the mass M of the battery pack are adequately set such that the inertia moment I around the axis J can be a sufficiently increased, the user's hand can be prevented or restrained from being swung against such a large reaction.

Further, in the aspect, in order to perform the screw tightening operation quickly and reliably, a change rate of the output rotation speeds before and after the automatic speed change is set to be higher than ever before by setting the output rotation speeds as described above. As a result, the reaction during the automatic speed change can be increased than in the normal state. However, the electrical power tool can be prevented from being swung around the axis and the operability thereof can be ensured. Thus, a specifically significant effect can be obtained.

According to another aspect of the present invention, the electrical power tool having the automatic speed change device of this type can be effectively prevented from being swung about the axis J against the reaction that is generated during the speed change. For example, when the distance L from the axis J to the center of gravity of the battery pack is 195 mm, and the mass M of the battery pack is 0.6 kg, the inertia moment I around the axis J of the electrical power tool configured is approximately 23,000 ($kg \cdot mm^2$). This moment is greater than the reaction that is generated during the speed change. Therefore, the electrical power tool can be prevented from being swung around the axis J. Consequently, the user only have to grip the electrical power tool gently even at a moment of the automatic speed change.

According to the aspect, the inertia moment I is set to a range from 20,000 to 40,000 ($kg \cdot mm^2$). Therefore, various types of electrical power tools can be prevented from being swung provided that they have the distance L and the mass M equivalent to the distance L and the mass M described above.

According to a further aspect of the present invention, the output rotation speed of the speed change device in the high speed low torque mode is set to 4.5 times to 6.0 times the output rotation speed in the low speed high torque mode. Therefore, if an output rotation speed is set such that a necessary and sufficient torque can be obtained in the low speed high torque mode, it is possible to set the output rotation speed in the high speed low torque mode to an extremely high speed than ever before. In this case, the rotation speed in the high speed low torque mode can be set to a high speed which speed cannot generate a sufficient torque that allows the operation to be completed to the end. When the operation is progressed and a condition in which the output torque is not enough is developed, the speed change device is automatically changed, so that the low speed high torque mode is obtained. Therefore, the operation can be completed to the end.

Thus, because the output rotation speed before and after the speed changing operation is changed at a higher ratio than ever before, in the initial stage of the operation, the operation can be quickly performed by an extremely high speed rotation. This can only be possible by the automatic speed change device that can be automatically changed to the low speed high torque mode when the condition in which the required output torque is not enough is developed.

BEST MODES FOR CARRYING OUT THE INVENTION

Figure 1:
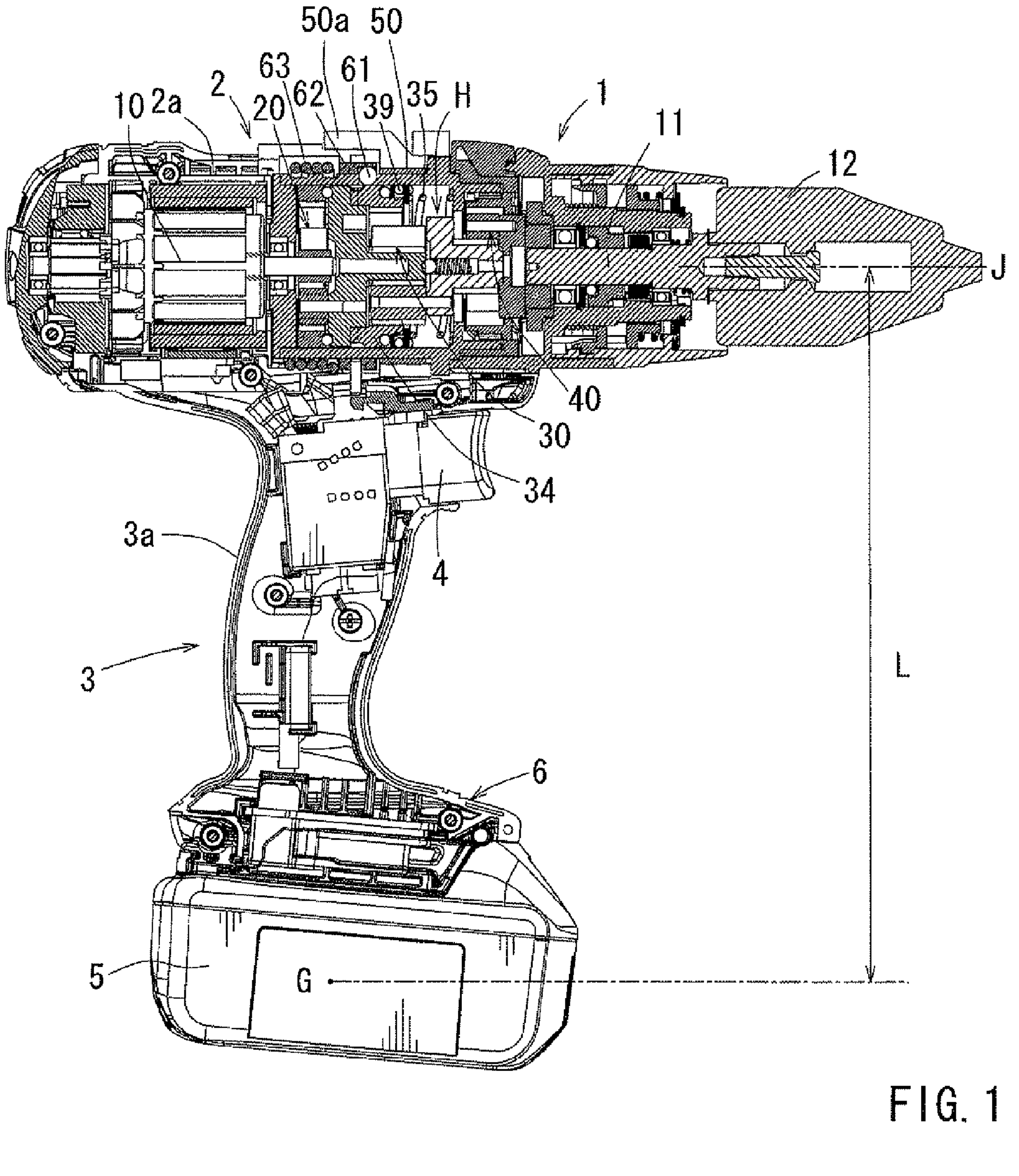
FIG. 1 is a vertical longitudinal sectional view of the whole of an electrical power tool of the present embodiment. The view shows an initial condition of a speed change device.

Next, an embodiment of the invention will be described with reference to FIGS. 1 to 12. FIG. 1 shows the whole of an electrical power tool 1 according to the embodiment. In the embodiment, a rechargeable electric screwdriver drill is illustrated as one example of the electrical power tool 1. The electrical power tool 1 can be used as an electric screw tightening machine by attaching a screwdriver bit as an end tool. Further, the electrical power tool 1 can be used as an electric screwdriver for hole drilling by attaching a drill bit.

The electrical power tool 1 includes a main body portion 2 and a handle portion 3. The main body portion 2 has a substantially cylindrical shape. The handle portion 3 is provided to the main body portion 2 while being protruded laterally from a midpoint of the main body portion 2 in a longitudinal direction (an axial direction) thereof. Each of the main body portion 2 and handle portion 3 includes a housing that is composed of two half housings separated into right and left with respect to the axial direction (a left-right direction in FIG. 1) and matched with each other and joined together. Hereinafter, the housing of the main body portion 2 and the housing of the handle portion 3 will respectively be referred to as a main body housing 2*a* and a handle housing 3*a*, and will be distinguished from one another as necessary.

A trigger-type switch lever 4 is disposed on a front side of a proximal portion of the handle portion 3. An electric motor 10 is actuated when a user operates the switch lever 4 by triggering it with a fingertip. Also, a distal end of the handle portion 4 is provided with a battery attachment pedestal portion 6 to which a battery pack 5 is attached. The electric motor 10 is actuated by the battery pack 5 as a power source.

The electric motor 10 is incorporated in a back portion of the main body portion 2. Rotative power of the electric motor 10 is decelerated by a speed change device H having three planetary gear trains, and is then output to a spindle 11. A chuck 12 for attaching the end tool is attached to a distal end of the spindle 11.

Figure 2:
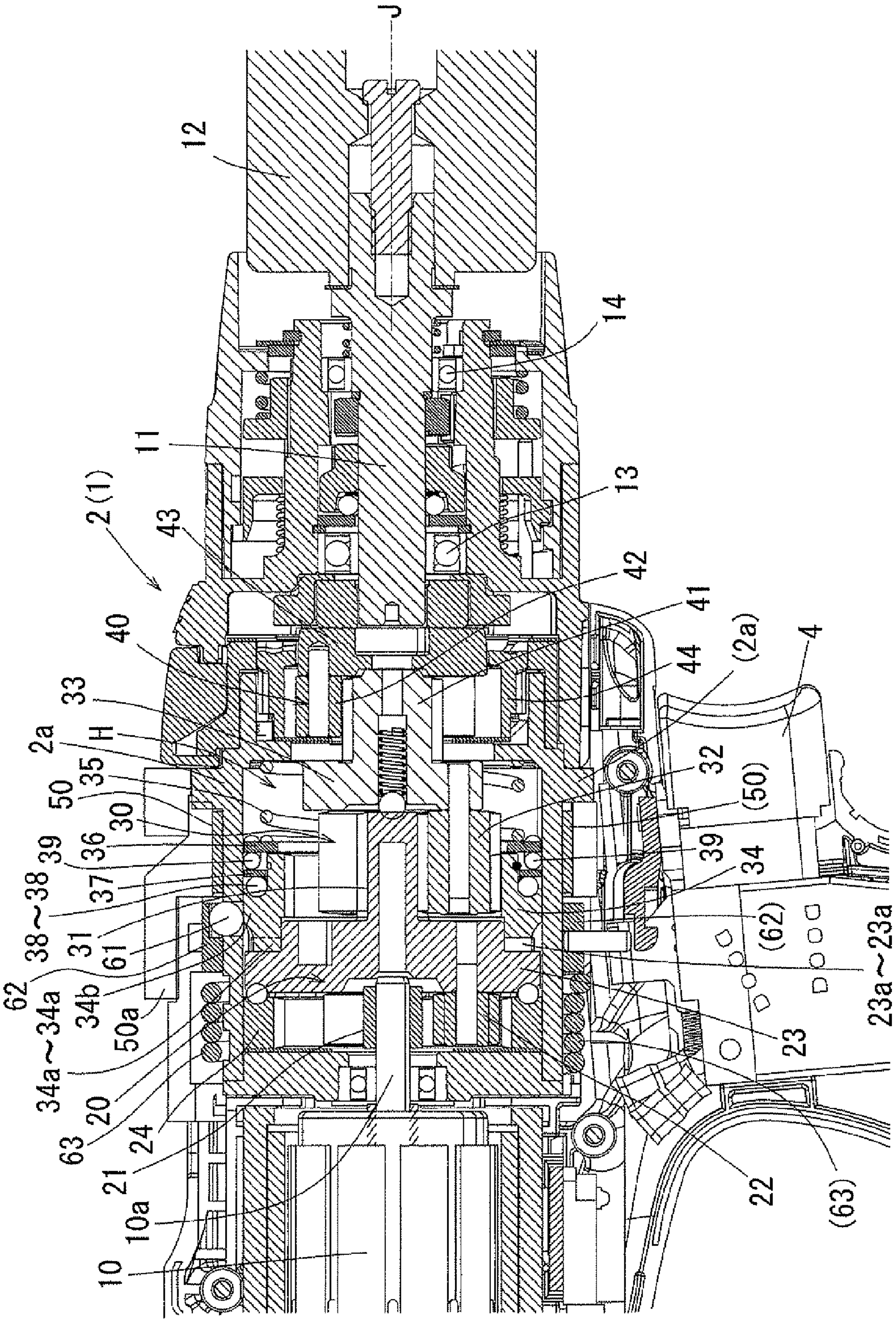
FIG. 2 is an enlarged view of the speed change device according to the embodiment. The view shows a high speed low torque output condition in an automatic speed change mode which corresponds to the initial condition of the speed change device.

The three planetary gear trains are interposed in a power transmission pathway from the electric motor 10 to the spindle 11. Hereinafter, these three planetary gear trains will be referred to as a first stage planetary gear train 20, a second stage planetary gear train 30 and a third stage planetary gear train 40 in this order from an upstream side of the power transmission pathway. Details of the first to third stage planetary gear trains 20, 30 and 40 are shown in FIG. 2. The first to third stage planetary gear trains 20, 30 and 40 are positioned coaxially with an output shaft 10*a* of the electric motor 10, and are positioned coaxially with the spindle 11. Hereinafter, a rotation axis of the spindle 11 (a rotation axis of the output shaft 10*a* of the electric motor 10) may be referred to also as an axis J. The electric motor 10, the first to third stage planetary gear trains 20, 30 and 40, and the spindle 11 are disposed on the axis J. A direction extending along the axis J corresponds to the axial direction of the electrical power tool 1, and the axial direction corresponds to a longitudinal direction of the main body portion 2.

A first stage sun gear 21 of the first stage planetary gear train 20 is attached to the output shaft 10*a* of the electric motor 10. Three first stage planetary gears 22 to 22 are meshed with the first stage sun gear 21. The three first stage planetary gears 22 to 22 are rotatably supported by a first stage carrier 23. Also, the three first stage planetary gears 22 to 22 are meshed with a first stage internal gear 24. The first stage internal gear 24 is disposed along and attached to an inner surface of the main body housing 2*a*. The first stage internal gear 24 is fixed so as to not be rotatable around the axis J and to not be movable in the direction of the axis J.

A second stage sun gear 31 is integrally provided to a center of a front surface of the first stage carrier 23. Three second stage planetary gears 32 to 32 are meshed with the second stage sun gear 31. The three second stage planetary gears 32 to 32 are rotatably supported by a second stage carrier 33. Also, the three second stage planetary gears 32 to 32 are meshed with a second stage internal gear 34. The second stage internal gear 34 is disposed along and supported on the inner surface of the main body housing 2*a* in a condition in which it is rotatable around the axis J and is displaceable within a certain range in the direction of the axis J. Details of the second stage internal gear 34 will be hereinafter described.

A third stage sun gear 41 is integrally provided to a center of a front surface of the second stage carrier 33. Three third stage planetary gears 42 to 42 are meshed with the third stage sun gear 41. The three third stage planetary gears 42 to 42 are rotatably supported by a third stage carrier 43. Also, the three third stage planetary gears 42 to 42 are meshed with a third stage internal gear 44. The third stage internal gear 44 is disposed along and attached to the inner surface of the main body housing 2*a*. The third stage internal gear 44 is fixed so as to not be rotatable around the axis J and to not be movable in the direction of the axis J.

The spindle 11 is coaxially connected to a center of a front surface of the third stage carrier 43. The spindle 11 is supported on the main body housing 2*a* via bearings 13 and 14, so as to be rotatable around the axis J. The chuck 12 is attached to the distal end of the spindle.

As previously described, the second stage internal gear 34 is supported so as to be rotatable around the axis J and movable within a certain range in the direction of the axis J. A plurality of clutch teeth 34*a* to 34*a* are circumferentially provided on a back surface of the second stage internal gear 34. The clutch teeth 34*a* to 34*a* are meshed with clutch teeth 23*a* to 23*a* that are circumferentially provided on the front surface of the first stage carrier 23 in the same way. Due to a meshing condition of the clutch teeth 23*a* and 34*a*, the second internal gear 34 can rotate together with the first stage carrier 23. The meshing condition of the clutch teeth 23*a* and 34*a* can be released when the second stage internal gear 34 is applied with an external torque for causing the second stage internal gear 34 to rotate relative to the first stage carrier 23, and the second stage internal gear 34 is displaced forwardly in the direction of the axis J (in a direction away from the first stage carrier 23).

FIG. 2 shows a condition in which the clutch teeth 34*a* to 34*a* of the second stage internal gear 34 are meshed with the clutch teeth 23*a* to 23*a* of the first stage carrier 23. In this meshing condition, the second stage internal gear 34 is positioned in a rotation allowance position that is positioned rearwardly in the direction of the axis J (a left side in FIG. 2). In the rotation allowance position, the second stage internal gear 34 rotates together with the first stage carrier 23. Therefore, in this case, the second stage sun gear 31 and the second stage internal gear 34 integrally rotate. When the external torque of a certain value or more is applied to the second stage internal gear 34 via the spindle 11, the second stage internal gear 34 rotates relative to the first stage carrier 23, so that the clutch teeth 34*a* and clutch teeth 23*a* are disengaged from each other. As a result, the second stage internal gear 34 is displaced forwardly in the direction of the axis J (toward a right side in FIG. 2).

The second stage internal gear 34 is biased toward the rotation allowance position by a compression spring 35. Thus, the second stage internal gear 34 is displaced forwardly in the direction of the axis J (in a direction in which the clutch teeth 23*a* and 34*a* are disengaged from each other) against a biasing force of the compression spring 35. Also, a certain external torque is set based on the biasing force of the compression spring 35, so that the second stage internal gear 34 can be displaced forwardly, thereby switching a reduction ratio.

The compression spring 35 acts on a front surface of the second stage internal gear 34 with interleaving a pressing plate 36 therebetween. That is, the second stage internal gear 34 is pressed toward the rotation allowance position in a direction in which the clutch teeth 34*a* and 23*a* are meshed with each other by the biasing force of the compression spring 35 acting via the annular pressing plate 36 that is contacting the front surface of the second stage internal gear 34.

A rolling plate 37 is disposed on a back side of the pressing plate 36. The rolling plate 37 also has an annular shape and is disposed along and supported on a circumferential periphery of the second stage internal gear 34 so as to be rotatable around the axis J. A large number of steel balls 38 to 38 are inserted between the rolling plate 37 and a front surface of a flange portion 34*b* that is provided on a circumferential surface of the second stage internal gear 34. The steel balls 38 to 38 and the rolling plate 37 function as a thrust bearing that is capable of applying the biasing force of the compression spring 35 to the second stage internal gear 34 while rotatably supporting the same.

Figure 3:
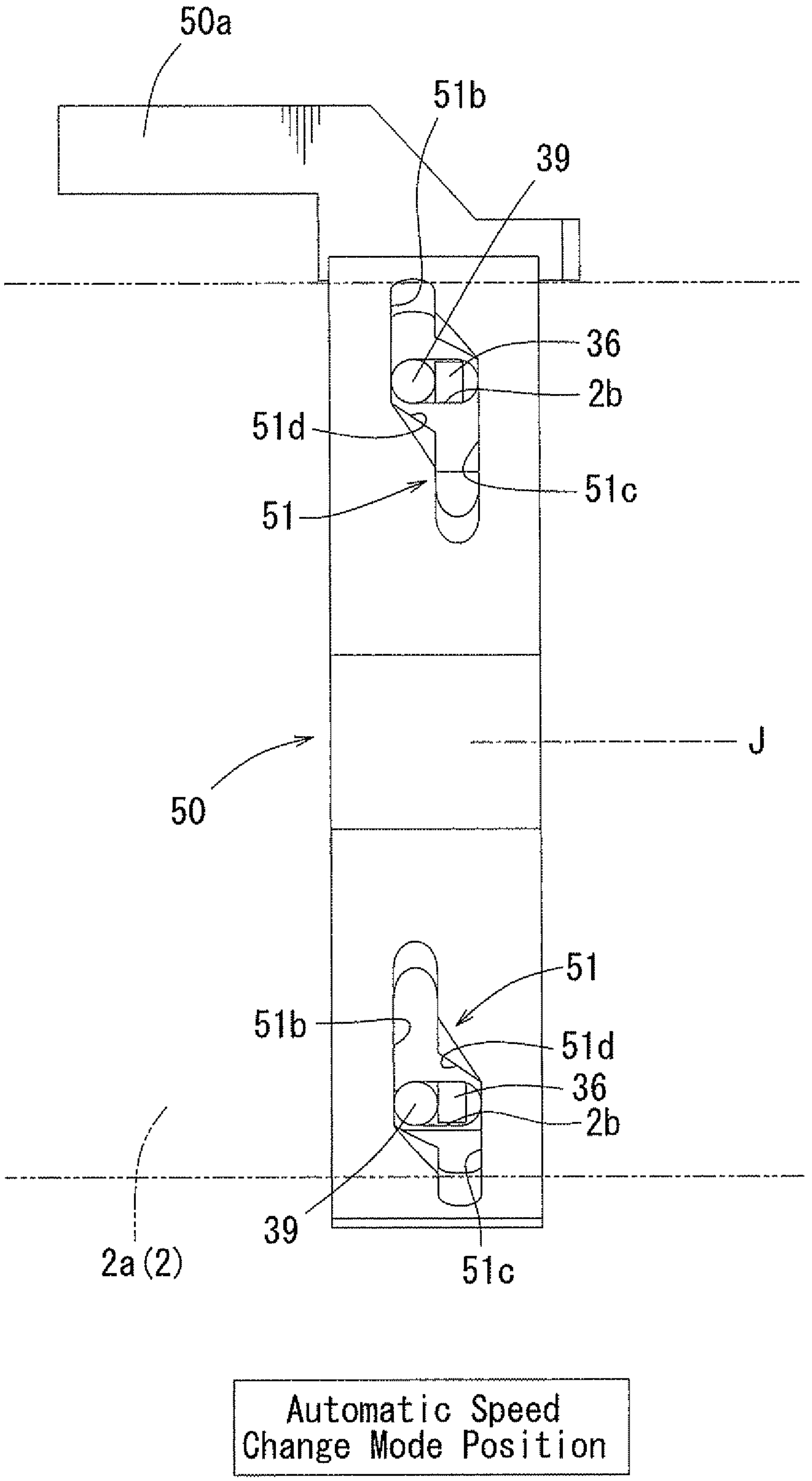
FIG. 3 is a side view of a mode switching ring in a condition in which it is switched to an automatic speed change mode position. The view shows the high speed low torque output condition.

Two upper and lower mode switching members 39 and 39 are inserted between the front side pressing plate 36 and back side rolling plate 37. In the embodiment, two elongated shafts (pins) are used as the two mode switching members 39 and 39. The two mode switching members 39 and 39 are positioned in an upper portion and a lower portion between the pressing plate 36 and rolling plate 37 and are inserted in a direction perpendicular to the plane of FIG. 2 in parallel to each other. Both end portions of each of the two mode switching members 39 and 39 are respectively protruded to an exterior of the main body housing 2*a*. As shown in FIG. 3, both end portions of the two mode switching members 39 and 39 are protruded to the exterior through insertion slots 2*b* to 2*b* that are formed in both side portions of the main body housing 2*a*. The two upper and lower mode switching members 39 and 39 are supported in parallel to each other while bridging both side portions of the main body housing 2*a*. Each of a total of four insertion slots 2*b* to 2*b* is formed to be elongated in the direction of the axis J and has a slot width such that each of the mode switching members 39 can be inserted therethrough. Therefore, the two upper and lower mode switching members 39 and 39 are capable of moving forward and backward in the direction of the axis J in parallel in a range in which both end portions thereof can be displaced in the insertion slots 2*b* and 2*b*. The two upper and lower mode switching members 39 and 39 simultaneously move in the same direction in parallel by a mode switching ring 50 which will be hereinafter described. In an initial condition shown in FIG. 2 (a condition in which the external torque is not applied to the spindle), the second stage internal gear 34 is positioned in the rotation allowance position by means of the compression spring 35. Therefore, in this condition, both of the mode switching members 39 and 39 are positioned rearwardly and are changed to a condition in which they are sandwiched between the pressing plate 36 and rolling plate 37.

To the contrary, when both of the mode switching members 39 and 39 move forwardly in parallel, the pressing plate 36 is moved forwardly in parallel against the compression spring 35. When the pressing plate 36 is moved forwardly in parallel, the compression spring 35 no longer acts on the second internal gear 34. In a condition in which the biasing force of the compression spring 35 does not act on the second stage internal gear 34, a force capable of maintaining the meshing condition of the clutch teeth 34*a* and clutch teeth 23*a* is lost. Therefore, when a slight external force in a rotation direction (for example, a starting torque of the transmission motor 10) is applied to the second stage internal gear 34, the second stage internal gear 34 rotates relative to the first stage carrier 23. As a result, the second stage internal gear 34 is displaced forwardly in the direction of the axis J.

The two upper and lower mode switching members 39 and 39 can be easily operated and moved from the exterior by an rotating operation of the mode switching ring 50 described above. The mode switching ring 50 has an annular shape and is supported on an outer circumferential side of the main body housing 2*a* so as to be rotatable around the axis J. The mode switching ring 50 has a finger grip portion 50*a* that is integrally provided in one place on a circumference thereof, so that the user can grip the same in order to operate and rotate the mode switching ring 50.

Three operation modes can be optionally switched by operating and rotating the mode switching ring 50 around the axis J in a certain angular range. The three operation modes correspond to an automatic speed change mode in which a rotation output of the electrical power tool 1 can be automatically switched from a "high speed low torque" output condition (a high speed low torque mode) to a "low speed high torque" output condition (a low speed high torque mode) when the external torque applied to the spindle 11 reaches the certain value that is set based on the biasing force of the compression spring 35, a high speed fixed mode in which the rotation output is fixed in the "high speed low torque" output condition, and a high torque fixed mode in which the rotation output is fixed in the "low speed high torque" output condition.

As shown in FIG. 3, the mode switching ring 50 has four switching groove portions 51 to 51 that are formed therein so as to correspond to (so as to be positioned in portion coinciding with) the four insertion slots 2*b* to 2*b* of the main body housing 2*a*. A portion of each of the end portions of the two upper and lower mode switching members 39 and 39, which portion is protruded from the main body housing 2*a*, is inserted into each switching groove portion 51.

Each switching groove portion 51 is formed in a substantially cranked shape (S-shape) and has a back side groove portion 51*b* for the high speed fixed mode which groove portion is elongated in directions around the axis J, a front side groove portion 51*c* for the high torque fixed mode which groove portion is elongated in the directions around the axis J similar to the back side groove portion 51*b*, and an intermediate groove portion 51*d* for the automatic speed change mode which groove portion communicates both of the groove portions 51*b* and 51*c* with each other. With regard to positions in the direction of the axis J, the back side groove portion 51*b* is displaced rearwardly (leftwardly in FIG. 3), and the front side groove portion 51*c* is displaced forwardly (rightwardly in FIG. 3) than that by an amount substantially equivalent to a groove width.

The intermediate groove portion 51*d* which communicates the back side groove portion 51*b* and the front side groove portion 51*c* with each other is formed so as to be elongated in the direction of the axis J and has the substantially same length as the insertion slots 2*b* of the main body housing 2. FIG. 3 shows a condition in which either end portion of each of the two upper and lower mode switching members 39 and 39 is positioned in the intermediate groove portion 51*d*. In this case, the mode switching ring 50 is switched to the automatic speed change mode. In FIG. 3, the end portion of each mode switching member 39 is positioned on a back side of the intermediate groove portion 51*d*. This condition corresponds to a condition in which the external torque of the certain value or more does not act on the spindle 11, and in which the biasing force of the compression spring 35 acts on the second stage internal gear 34 via the pressing plate 36, and as a result, the second stage internal gear 34 is held in the rotation allowance position so as to be rotated together with the first stage carrier 23. This condition corresponds to an initial condition of the speed change device H of the electrical power tool 1 of the present embodiment.

In the initial condition, positions of the switching groove portions 51 to 51 (positions of back end portions thereof in the direction of the axis J) are set such that the whole or a portion of the biasing force of the compression spring 35 can be received when the two upper and lower mode switching members 39 and 39 are pressed against the back end portions of the switching groove portions 51 to 51. Therefore, in an idling condition immediately after actuation of the electric motor 10 (a no load condition), the biasing force of the compression spring 35 is barely applied to the second stage internal gear 34, or only a portion thereof is applied thereto. As a result, a torque necessary to rotate the second stage internal gear 34 (a rotational resistance) is reduced, so that a power consumption (a current value) of the electrical power tool 1 can be reduced.

Figure 4:
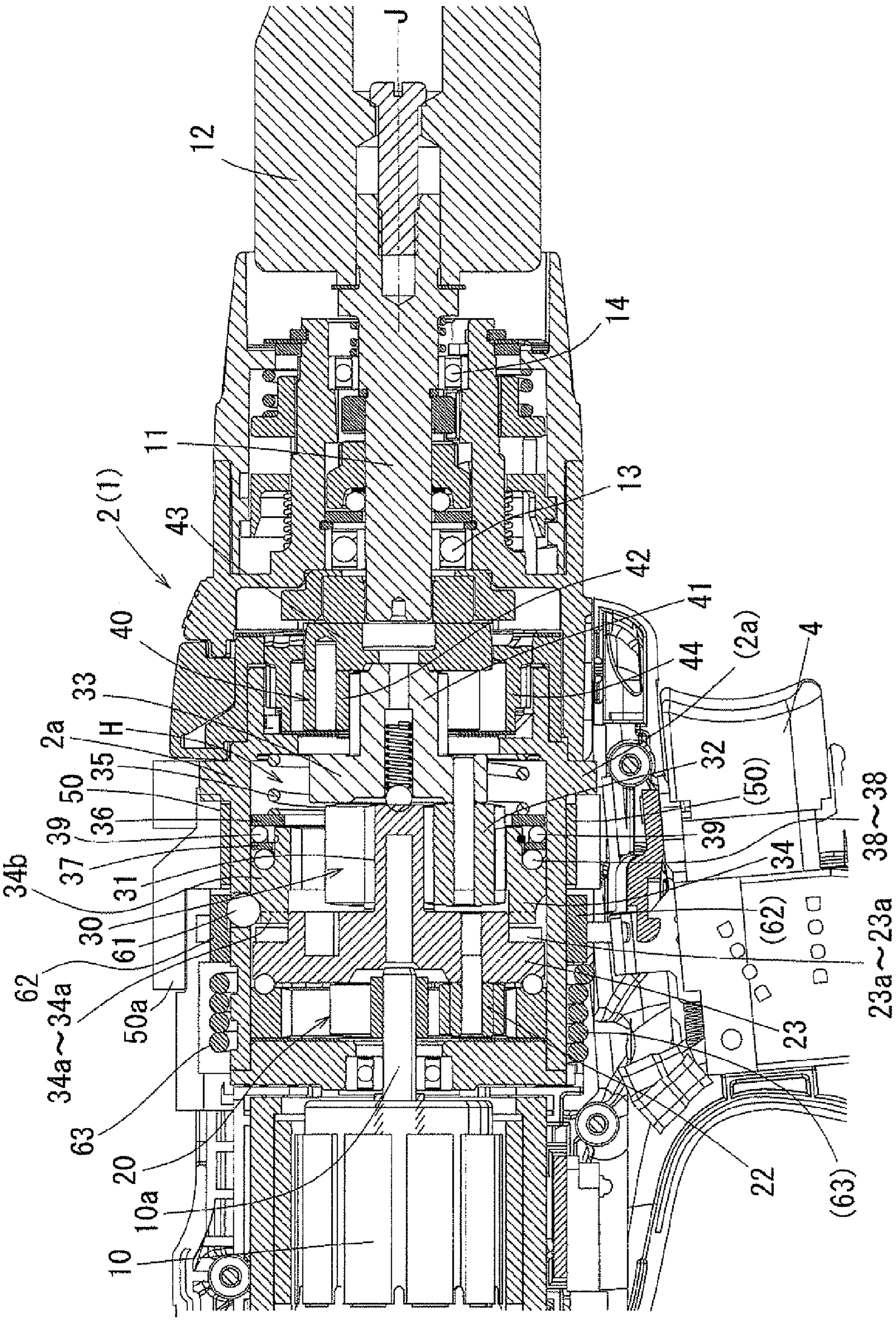
FIG. 4 is an enlarged view of the speed change device according to the embodiment. The view shows a low speed high torque output condition in the automatic speed change mode.
Figure 5:
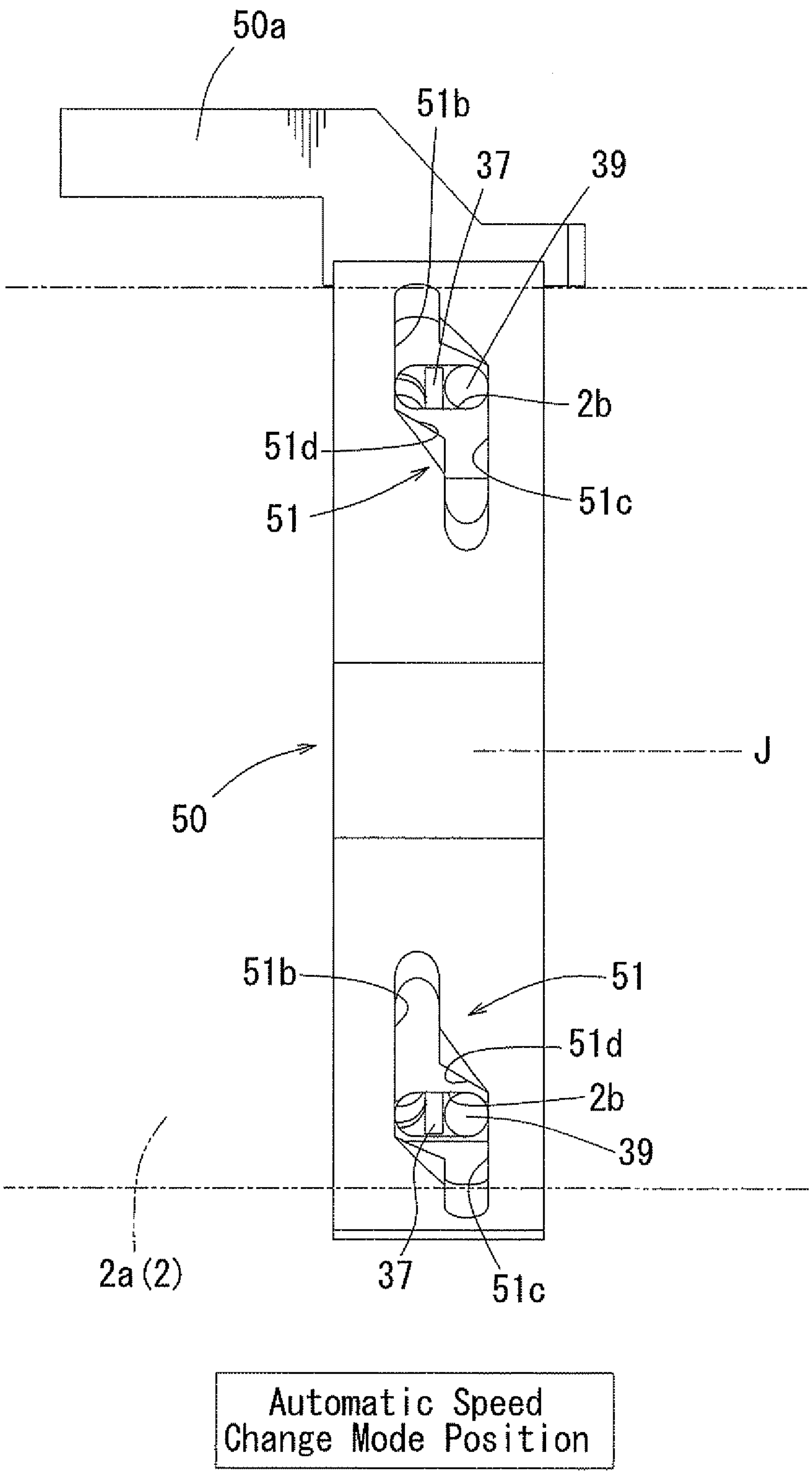
FIG. 5 is a side view of the mode switching ring in a condition which it is switched to the automatic speed change mode position. The view shows the low speed high torque output condition.

In the automatic speed change mode, each of the two upper and lower mode switching members 39 and 39 can be displaced within the intermediate groove portion 51*d* in the direction of the axis J. Therefore, when the external torque of the certain value or more is applied to the spindle 11, the second stage internal gear 34 is displaced to a rotation restriction position positioned on a front side in the direction of the axis J against the compression spring 35. This condition is shown in FIGS. 4 and 5. When the external torque applied to the spindle 11 is reduced to the certain value or less, the second stage internal gear 34 is returned to the rotation allowance position positioned on a back side in the direction of the axis J by the compression spring 35, so as to be returned to the initial condition in which it can rotate together with the first stage carrier 23. This condition is shown in FIGS. 2 and 3.

Because the second stage internal gear 34 is positioned in the back side rotation allowance position, in a condition in which the clutch teeth 34*a* to 34*a* of the second stage internal gear 34 are meshed with the clutch teeth 23*a* to 23*a* of the first stage carrier 23, the second stage internal gear 34 rotates together with the first stage carrier 23. As a result, the reduction ratio of the second stage planetary gear train 30 decreases, so that the spindle 11 rotates at a high speed and with a low torque. In the case of the present embodiment, an output rotation speed of the spindle 11 in this high speed low torque mode is set to about 2000 rpm.

To the contrary, when the external torque applied to the spindle 11 reaches the certain value or more, the second stage internal gear 34 is displaced to the front side rotation restriction position and as a result, so that the clutch teeth 34*a* to 34*a* of the second stage internal gear 34 and the clutch teeth 23*a* to 23*a* of the first stage carrier 23 can be disengaged from each other. In this condition, the reduction ratio of the second stage planetary gear train 30 increases, so that the spindle 11 rotates at a low speed and with a high torque. In the case of the present embodiment, the output rotation speed of the spindle 11 in this low speed high torque mode is set to about 400 rpm. In the automatic speed change mode, the switching between a former high speed low torque output condition and a latter low speed high torque output condition can be automatically performed based on the external torque applied to the spindle 11. In the former high speed low torque output condition, as shown in FIG. 3, the mode switching members 39 and 39 are positioned on the back side of the intermediate groove portion 51*d*. In the latter low speed high torque output condition, as shown in FIG. 5, the mode switching members 39 and 39 are positioned on the front side of the intermediate groove portion 51*d*. That is, the two upper and lower mode switching members 39 and 39 are displaced in the direction of the axis J together with the second stage internal gear 34.

Figure 6:
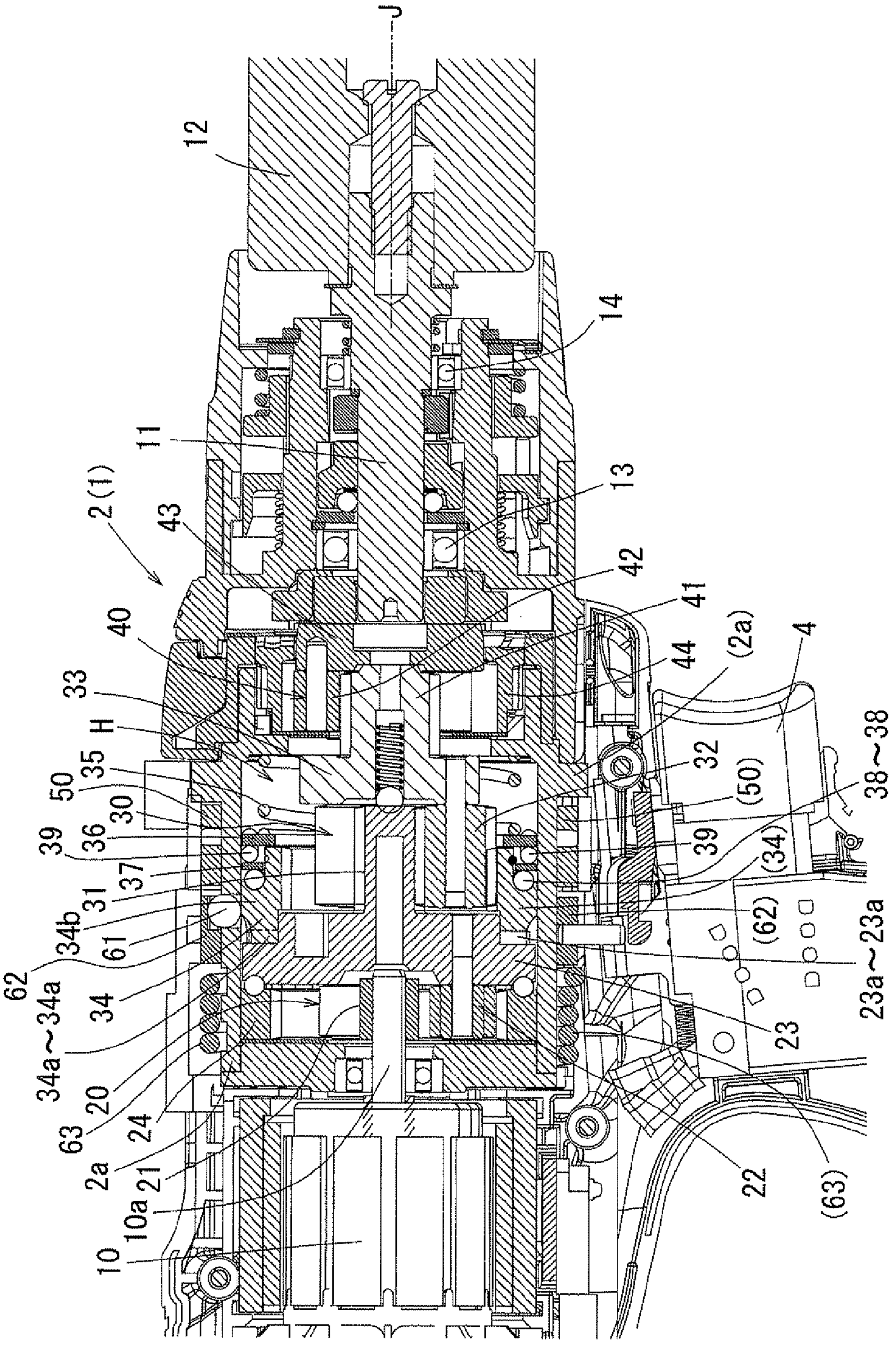
FIG. 6 is an enlarged view of the speed change device according to the embodiment. The view shows a condition in which the mode is switched to a high speed fixed mode.
Figure 7:
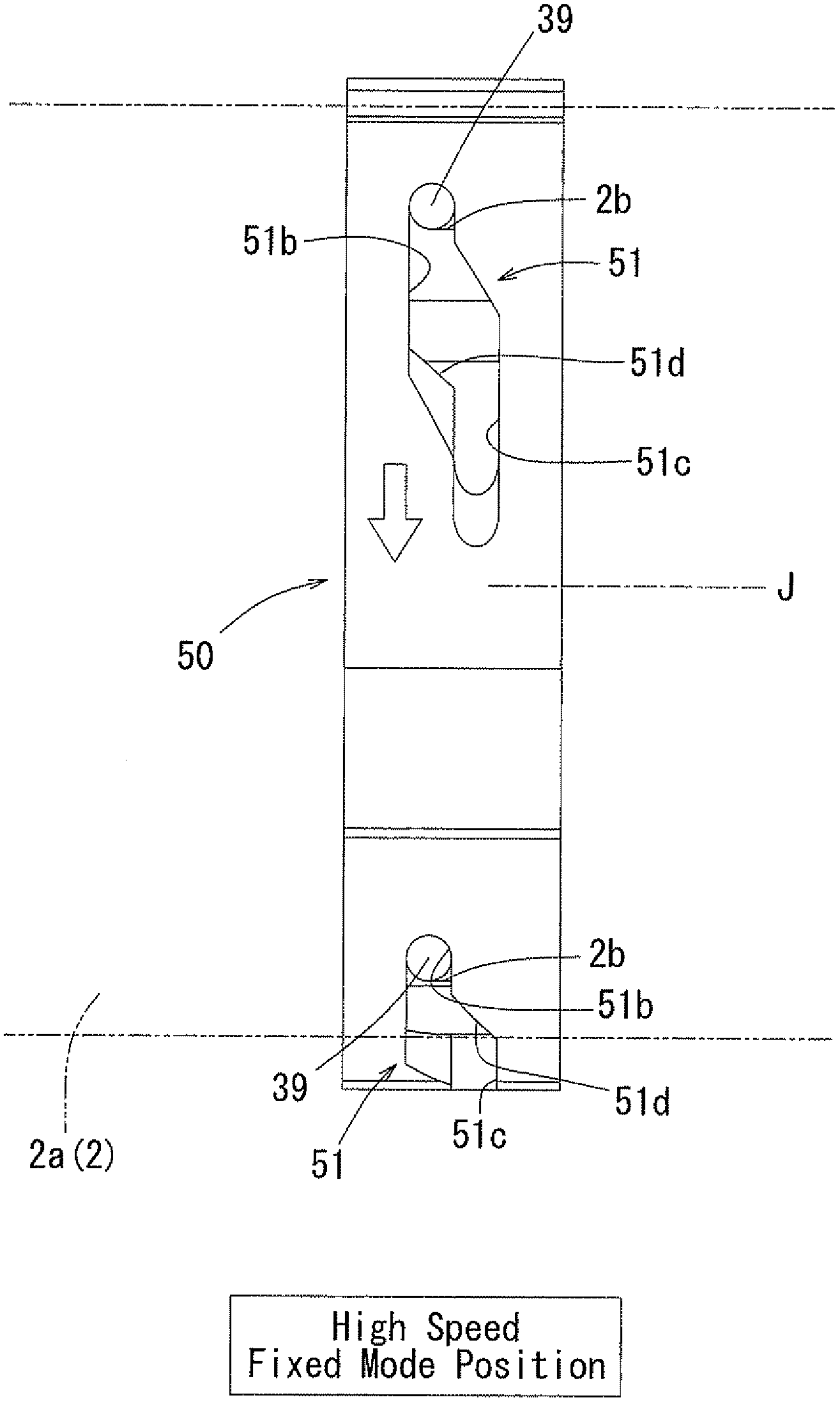
FIG. 7 is a side view of the mode switching ring in a condition in which it is switched to a high speed fixed mode position.

When the mode switching ring 50 is operated and rotated from an automatic speed change mode position shown in FIGS. 2 to 5 to a high speed fixed mode position shown in FIG. 7, the speed change device H can be switched to the high speed fixed mode. In this case, when the mode switching ring 50 is operated and rotated a certain angle clockwise as seen from the user (in a direction in which the finger grip portion 50*a* is turned over toward the near side in FIGS. 3 and 5), the automatic speed change mode is switched to the high speed fixed mode. When the mode switching ring 50 is switched to the high speed fixed mode, a condition in which either end portion of each of the two upper and lower mode switching members 39 and 39 is relatively inserted into the back side groove portion 51*b* is obtained. In this condition, both mode switching members 39 and 39 are fixed in back side positions in the direction of the axis J, so as to be prevented from being displaced forwardly. Therefore, even when the external torque of the certain value or more is applied to the spindle 11, as shown in FIG. 6, the second stage internal gear 34 is held in the rotation allowance position, so that the second stage planetary gear train 30 is held in a condition in which the reduction ratio thereof is lowered. As a result, the high speed low torque condition is output to the spindle 11. In this way, when the mode switching ring 50 is switched to the high speed fixed mode shown in FIG. 7, an output condition of the speed change device H is fixed in the high speed low torque output condition.

Also, in the high speed fixed mode, the two upper and lower mode switching members 39 and 39 contact the back end portions of the mode switching groove portions 51 similar to an initial condition in the automatic speed change mode, so that the whole or a portion of the biasing force of the compression spring 35 can be received by the mode switching members 39 and 39. Therefore, the rotational resistance of the second stage internal gear 34 can be reduced, and eventually, the power consumption (the current value) of the electrical power tool 1 can be reduced.

Figure 8:
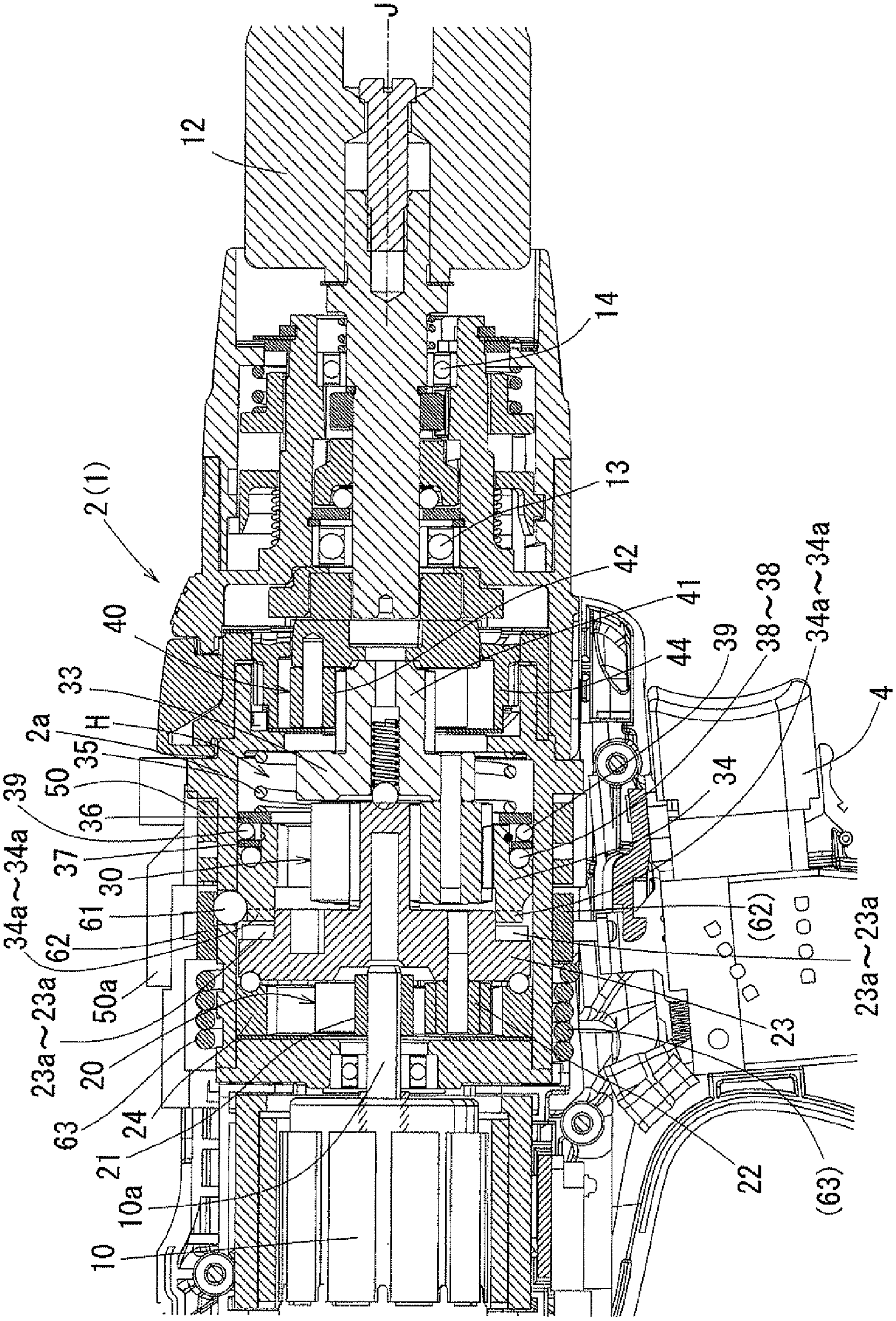
FIG. 8 is an enlarged view of the speed change device according to the embodiment. The view shows a condition in which the mode is switched to a low speed fixed mode.
Figure 9:
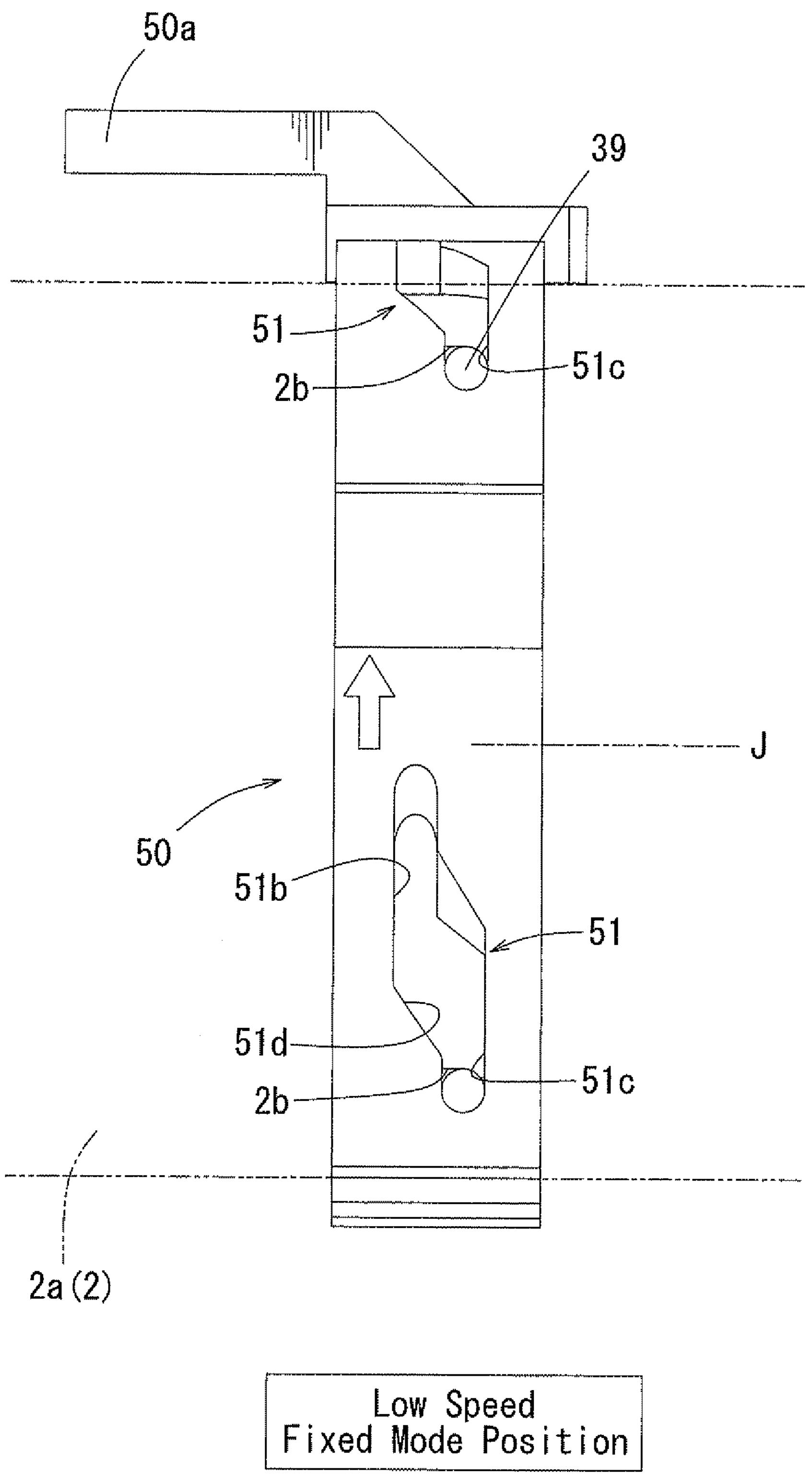
FIG. 9 is a side view of the mode switching ring in a condition in which it is switched to a low speed fixed mode position.
Figure 10:
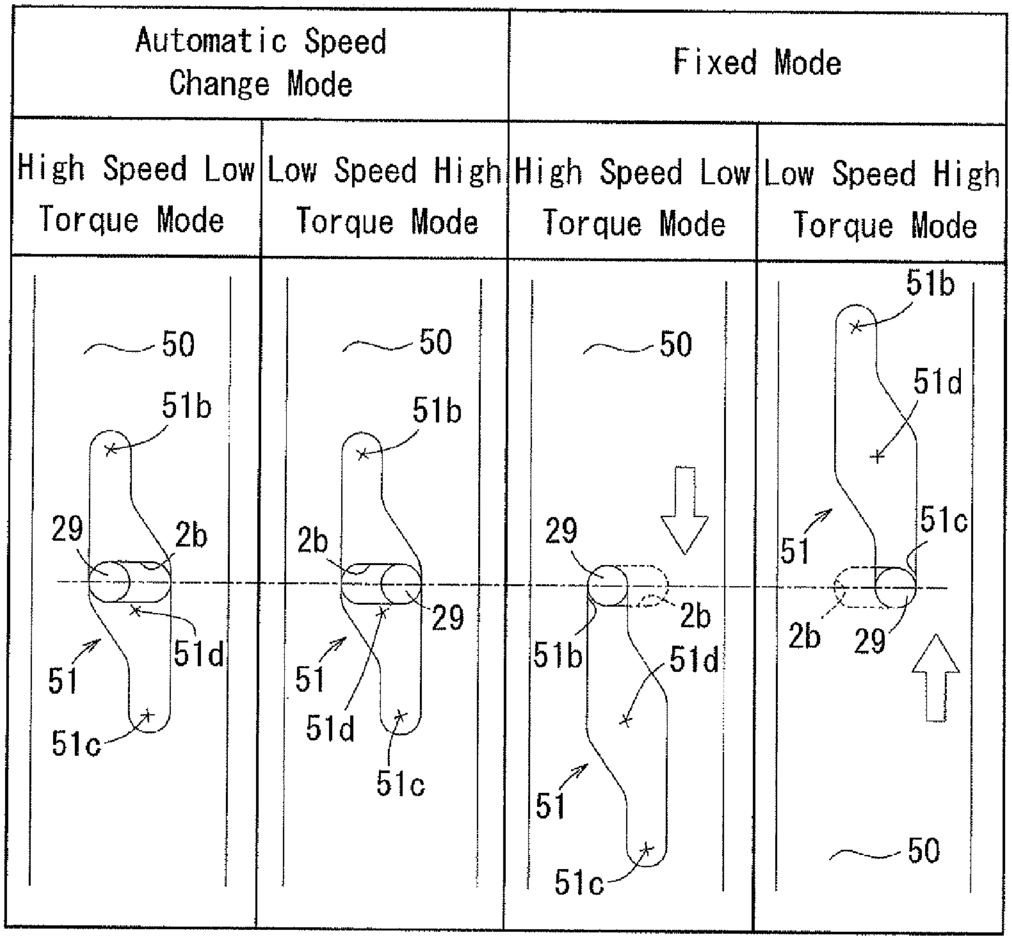
FIG. 10 is a diagram representing each operation mode of the speed change device according to the embodiment as a list.

When the mode switching ring 50 is operated and rotated from the automatic speed change mode position shown in FIGS. 3 and 5 or the high speed fixed mode position shown in FIG. 7 to a high torque fixed mode position shown in FIG. 9, the speed change device H can be switched to the high torque fixed mode. In this case, when the mode switching ring 50 is operated and rotated a certain angle counterclockwise as seen from the user (in a direction in which the finger grip portion 50*a* is turned over toward the rear side in FIGS. 3, 5 and 7), the automatic speed change mode or the high speed fixed mode is switched to the high torque fixed mode. When the mode switching ring 50 is switched to the high torque fixed mode, a condition in which either end portion of each of the two upper and lower mode switching members 39 and 39 is relatively inserted into the front side groove portion 51*c* is obtained. In the condition, both mode switching members 39 and 39 are displaced forwardly in the direction of the axis J against the compression spring 35, so as to be maintained in front side positions while being prevented from being displaced backwardly. Thus, a condition in which the biasing force of the compression spring 35 does not act on the second stage internal gear 34 is obtained. In this condition, at a point at which a slight external torque is applied to the spindle 11 (at a time at which the electric motor 10 is actuated), the second stage internal gear 34 is displaced to the front side rotation restriction position in the direction of the axis J, so as to be fixed by a mode lock mechanism 60, which will be hereinafter described, while it is prevented from being rotated. As a result, it is fixed to a condition in which a low speed high torque is output to the spindle 11. The condition is shown in FIG. 8. In this high torque condition, a condition in which the second stage internal gear 34 is substantially fixed in the front side rotation restriction position in the direction of the axis J is obtained. Therefore, it is fixed to a condition in which a low speed high torque is output.

In this way, upon operation of the mode switching ring 50 which can be operated and rotated from an exterior, the operation modes of the speed change device H can be switched to the automatic speed change mode, the high speed fixed mode, or the high torque fixed mode. A relation between each mode and the position of the mode switching member 39 within the switching groove 51 is collectively shown in FIG. 10. In the automatic speed change mode, when the external torque applied to the spindle 11 reaches the certain value, the mode is switched automatically from the high speed low torque mode having a low reduction ratio to the low speed high torque mode having a high reduction ratio. The low speed high torque mode is locked by the mode lock mechanism 60, which will be hereinafter described.

To the contrary, when the mode switching ring 50 is operated and rotated to the high speed low torque mode position, the positions of the two upper and lower mode switching members 39 and 39 in the direction of the axis J are fixed on the back side. As a result, the second stage internal gear 34 is locked in the rotation allowance position, so that a high speed low torque is constantly output to the spindle 11 regardless of a change in the external torque.

Conversely, when the mode switching ring 50 is operated and rotated to the low speed high torque mode position, the positions of the two upper and lower mode switching members 39 and 39 in the direction of the axis J are fixed on the front side. As a result, a condition in which the biasing force of the compression spring 35 does not act on the second stage internal gear 34 is obtained. Therefore, when the electric motor 10 is actuated, the second stage internal gear 34 is instantaneously displaced to the rotation restriction position by a slight external torque such as the starting torque of the electric motor 10, and is locked in the rotation restriction position by the mode lock mechanism 60, which will be hereinafter described. Thus, in the low speed high torque mode, a condition in which the second stage internal gear 34 is substantially constantly locked in the rotation restriction position is obtained, so that the low speed high torque is constantly output regardless of the change in the external torque applied to the spindle 11.

In the present embodiment, the reduction ratio of the speed change device H in the high speed low torque mode is set to a low reduction ratio in which a screw tightening operation cannot be completed by an output torque as generated. To the contrary, the reduction ratio in the low speed high torque mode is set to a sufficiently high reduction ratio in which the screw tightening operation can be completed by the output torque as generated without producing an incomplete tightening. Thus, in the present embodiment, a change rate between the reduction ratio in the high speed low torque mode and the reduction ratio in the low speed high torque mode is higher than a normal rate.

That is, as described above, the output rotation speed of the spindle 11 in the high speed low torque mode is set to about 2000 rpm, and the output rotation speed of the spindle 11 in the low speed high torque mode is set to about 400 rpm. Therefore, in the present embodiment, the output rotation speed in the high speed low torque mode is set to about five times the output rotation speed in the low speed high torque mode. When the ratio between the output rotation speeds is set in a range of 4.5 times to 6.0 times, the output rotation speed in the high speed low torque mode can be highly increased over conventional output rotation speeds. As a result, it is possible to achieve a speeding-up in an initial stage of the operation.

Figure 11:
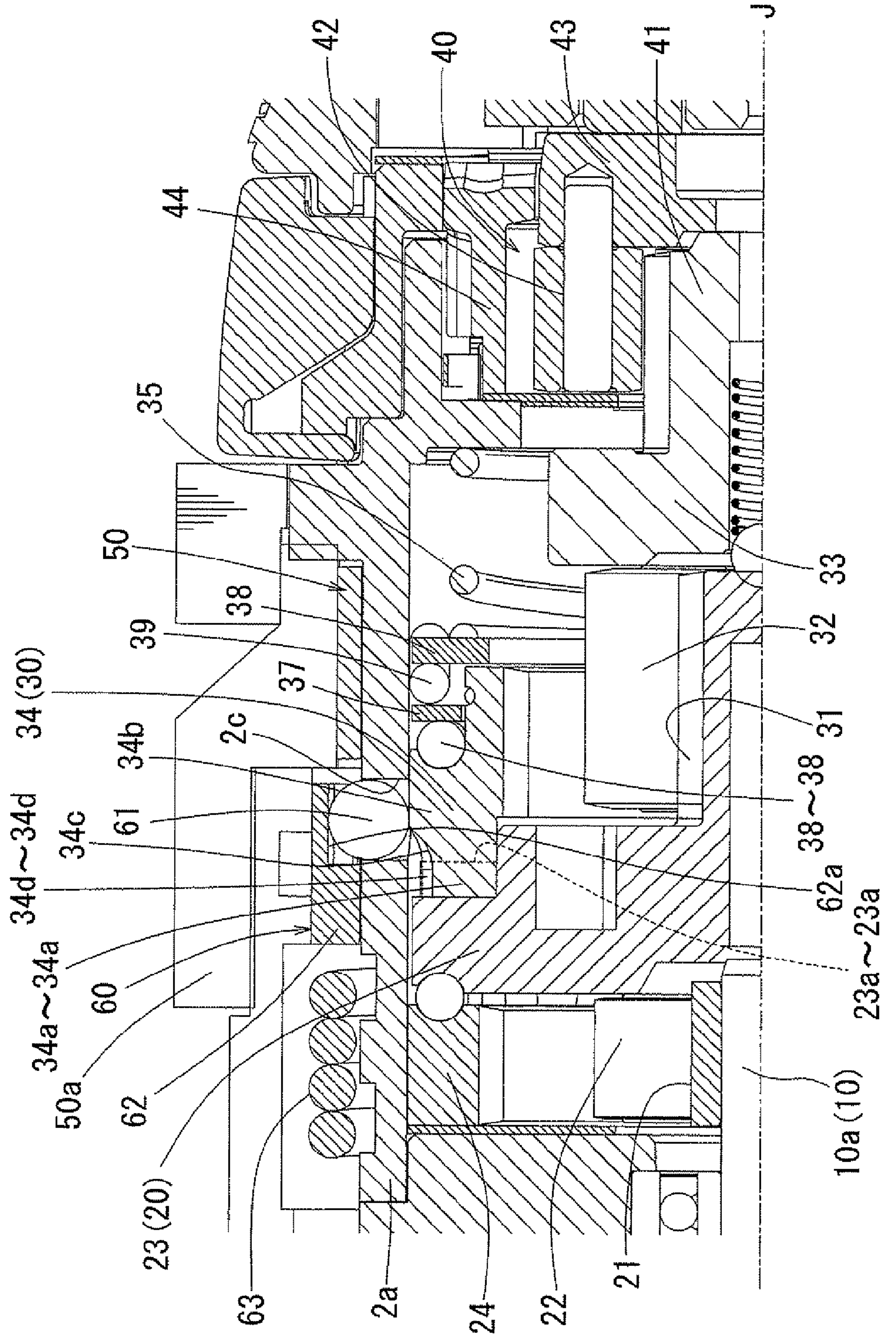
FIG. 11 is an enlarged view of a mode lock mechanism. The view shows an unlocked condition of the mode lock mechanism.
Figure 12:
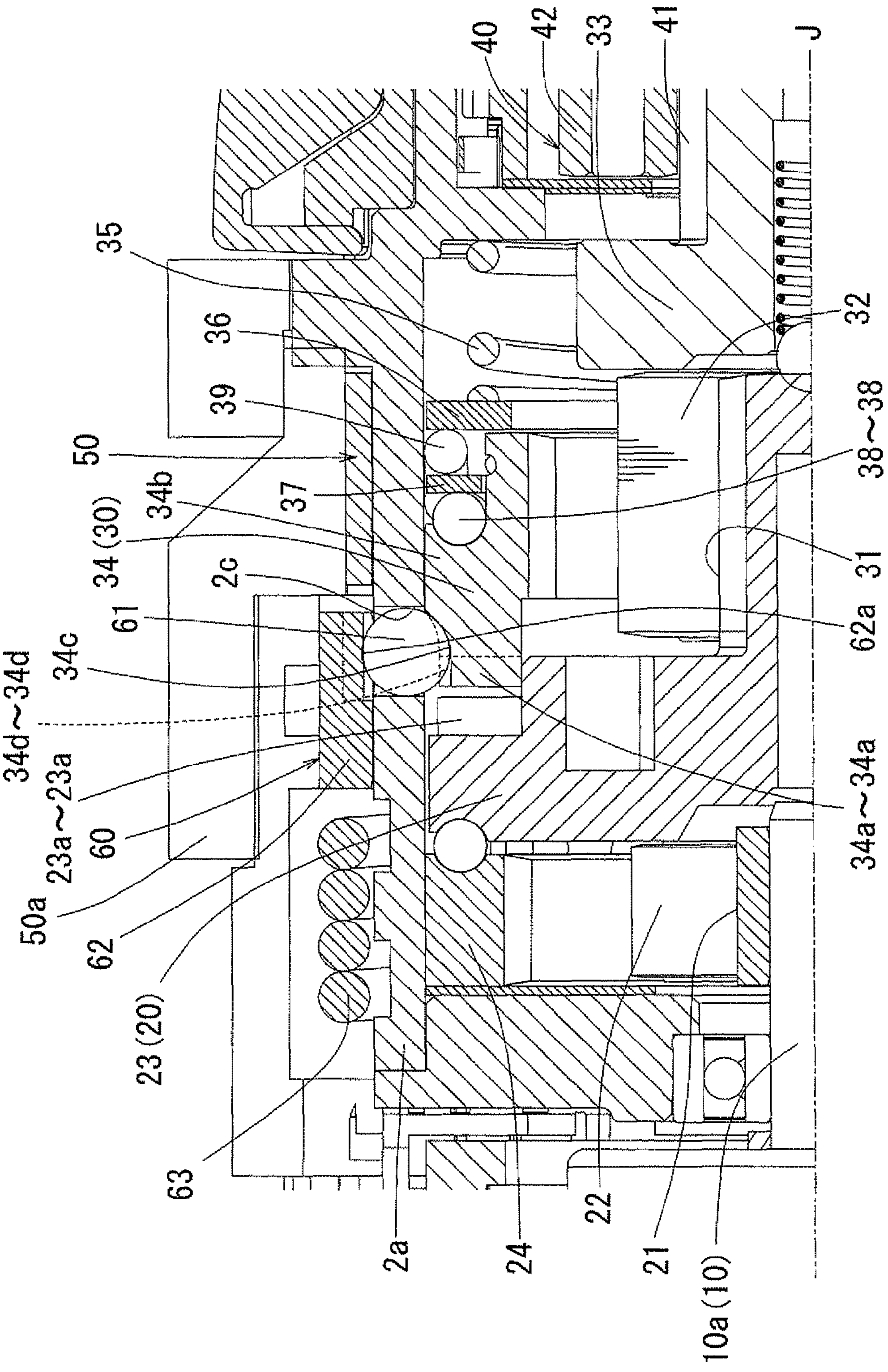
FIG. 12 is an enlarged view of the mode lock mechanism. The view shows a locked condition of the mode lock mechanism. The view shows a condition in which a second stage internal gear is locked in a rotation restriction position.

Next, the rotation restriction position (the front side position in the direction of the axis J) of the second stage internal gear 34 is held by the mode lock mechanism 60. Details of the mode lock mechanism 60 are shown in FIGS. 11 and 12, FIG. 11 shows a condition in which the mode lock mechanism 60 is released, so that the second stage internal gear 34 is held in the rotation allowance position (a condition in which the clutch teeth 23*a* and 34*a* are meshed with each other). Conversely, FIG. 12 shows a condition in which the second stage internal gear 34 is held in the rotation restriction position by the mode lock mechanism 60 (a condition in which the clutch teeth 23*a* and 34*a* are disengaged from each other).

The mode lock mechanism 60 has a function to hold the second stage internal gear 34 in the rotation restriction position positioned on the front side in the direction of the axis J, and a function to lock the second stage internal gear 34 positioned in the rotation restriction position so as to prevent the same from being rotated.

An engagement groove portion 34*c* is entirely provided in an outer circumferential surface of the second stage internal gear 34 so as to be positioned on the back side of the flange portion 34*b*. The engagement groove portion 34*c* has engagement wall portions 34*d* to 34*d* that are provided therein so as to be positioned on circumferentially trisected positions. Conversely, the main body housing 2*a* has engagement balls 61 that are held in circumferentially trisected positions thereof. The three engagement balls 61 to 61 are held in holding holes 2*c* formed in the main body housing 2*a*. Each engagement ball 61 is held in each holding hole 2*c*, so as to be inwardly projected to and retracted from an inner circumferential side of the main body housing 2*a*. A lock ring 62 is circumferentially disposed around the three engagement balls 61 to 61. The lock ring 62 is supported on an outer circumferential side of the main body housing 2*a* while being capable of rotating around the axis J.

The lock ring 62 has cam surfaces 62*a* to 62*a* that are provided in circumferentially trisected positions of an inner circumferential surface thereof. The cam surfaces 62*a* to 62*a* are shaped so as to be changed circumferentially in depth, and are positioned so as to correspond to the three engagement balls 61 to 61. Each engagement ball 61 slidably contacts each cam surface 62*a*. When the lock ring 62 rotates around the axis J in a certain range due to sliding action of each engagement ball 61 against each cam surface 62*a*, in the holding hole 2*c*, each engagement ball 61 moves between a retracted position (a position shown in FIG. 11) in which it is not inwardly projected to the inner circumferential side of the main body housing 2*a* and an engagement position (a position shown in FIG. 12) in which it is inwardly projected to the inner circumferential side of the main body housing 2*a*.

The lock ring 62 is biased in one of the directions around the axis J (to a locking side) by a torsion coil spring 63 that is interposed between the lock ring 62 and the main body housing 2*a*. With regard to a biasing direction of the lock ring 62 by the torsion coil spring 63, the lock ring 62 is biased to the direction (to the locking side) such that the cam surface 62*a* is rotated to displace each engagement ball 61 toward the engagement position. As shown in FIG. 11, in the condition in which the second stage internal gear 34 is positioned in the rotation allowance position by the biasing force of the compression spring 35, the flange portion 34*b* of the second stage internal gear 34 is positioned so as to close the holding holes 2*c*, so that each of the engagement balls 61 to 61 is pushed to the retracted position. As a result, the lock ring 62 is in a condition in which it is returned to an unlocking side against the torsion coil spring 63.

To the contrary, as shown in FIG. 12, when the second stage internal gear 34 moves to the rotation restriction position against the compression spring 35 or as a result of the biasing force of the compression spring 35 not acting, a condition in which the flange portion 34*b* is withdrawn from each holding hole 2*c* and in which the engagement groove portion 34*c* is aligned with each holding hole 2*c* is obtained. Thus, each engagement ball 61 is inwardly displaced to the inner circumferential side of the main body housing 2*a* and is fitted in the engagement groove portion 34*c*. Further, this fitted condition is maintained by a biasing force of the torsion coil spring 63. Thus, because each engagement ball 61 is held in the condition in which it is fitted in the engagement groove portion 34*c*, the second stage internal gear 34 is held in the rotation restriction position and each engagement ball 61 engages the engagement wall portion 34*d*. As a result, a condition in which the rotation around the axis J of the second stage internal gear 34 is locked is obtained. Further, when the second stage internal gear 34 is locked in the rotation restriction position, the condition in which the clutch teeth 34*a* to 34*a* thereof are disengaged from the clutch teeth 23*a* to 23*a* of the first stage carrier 23 is maintained.

Also, each of the engagement balls 61 to 61 is indirectly biased toward the engagement position because the biasing force of the torsion coil spring 63 acts thereon via the cam surface 62*a*. When each engagement ball 61 is fitted into the engagement groove portion 34*c* by a biasing force which biases each engagement ball 61 toward the engagement position, the biasing force can act through an interaction between a spherical shape of the engagement ball 61 and an inclined surface of the engagement groove portion 34*c*. Therefore, the biasing force can further indirectly act on the second stage internal gear 34 as a biasing force that biases the same toward the rotation restriction position. When the indirect biasing force of the torsion coil spring 63 acts on the second stage internal gear 34 as the biasing force that biases the same toward the rotation restriction position, the second stage internal gear 34 starts to be displaced from the rotation allowance position toward the rotation restriction position by the external torque that is returned via the spindle 11. As a result, each engagement ball 61 is instantaneously fitted into the engagement groove portion 34*c*, so that the second stage internal gear 34 quickly moves widely toward the rotation restriction position. Thus, as shown in FIG. 12, in a condition in which the second stage internal gear 34 is moved to the rotation restriction position, a condition in which an appropriate clearance is produced between the clutch teeth 34*a* to 34*a* of the second stage internal gear 34 and the clutch teeth 23*a* to 23*a* of the first stage carrier 23 is obtained. Therefore, the clutch teeth 23*a* to 23*a* of the first stage carrier 23 rotating in the directions around the axis J can be avoided from contacting each clutch teeth 34*a* of the second stage internal gear 34 that is rotationally locked. This allow a silent operation (a noise reduction) even after a speed changing operation to the high torque condition.

As a locking position of the lock ring 62 is maintained by the torsion coil spring 63, the speed change device 10 is held on the low speed high torque side. The locking position of the lock ring 62 can be released by a manual operation of the user. When the user manually operates the lock ring 62 held in the locking position to rotate the same to an unlocking position against the torsion coil spring 63, each engagement ball 61 is placed in a condition in which it is retracted to the retracted position. As a result, the second stage internal gear 34 is returned to the rotation allowance position by the compression spring 35. When the second stage internal gear 34 is returned to the rotation allowance position, a condition in which the clutch teeth 34*a* to 34*a* thereof are meshed with the clutch teeth 23*a* to 23*a* of the first stage carrier 23 is obtained. Also, when the second stage internal gear 34 is returned to the rotation allowance position, because the holding holes 2*c* are closed by the flange portion 34*b* of the second stage internal gear 34, each engagement ball 61 is held in the retracted position. Thus, even if the user takes his/her fingertip off the lock ring 61 thereafter, the lock ring 62 is held in the unlocking position against the torsion coil spring 63. Further, such a structure in which the lock ring 62 is returned to the unlocking position (an initial position) by the manual operation can be changed to, for example, a structure in which the lock ring 62 is automatically returned to the unlocking position by operating the trigger-type switch lever 4 as previously described.

Next, the electrical power tool 1 of the present embodiment is designed such that the electrical power tool 1 of which the handle portion 3 is gripped by the user is prevented from being swung around the axis J by a reaction (a swing force around the axis J) that can be produced when the high speed low torque mode is switched to the low speed high torque mode in the condition in which the speed change device H is switched to the automatic speed change mode. As shown in FIG. 1, in the present embodiment, an 18V power type of battery pack 5 (mass M=0.6 kg) is used, and a distance L between a center of gravity G of the battery pack 5 and the axis J is set to 195 mm. Therefore, an inertia moment I ($kg \cdot mm^2$) required to rotate the electrical power tool 1 rotate around the axis J is calculated as follows:

$$L^2 \times M = (195\ \text{mm})^2 \times 0.6\ \text{kg} = \text{approximately } 23{,}000\ (\text{kg} \cdot \text{mm}^2)$$

In this regard, in a conventional electrical power tool having an automatic speed change device, because the distance between the center of gravity of the battery pack and the axis is comparatively short, the inertia moment I is set to be smaller than the reaction around the axis J that can be produced during a speed changing operation. As a result, when the operation modes are switched from the high speed low torque mode to the low speed high torque mode by an automatic speed change, the electrical power tool is likely to be swung around the axis J by the swing force generated thereby. Therefore, the user must hold the handle portion strongly such that the electrical power tool 1 cannot to be swung. This means that the conventional electrical power tool is low in terms of usability.

According to the electrical power tool 1 of the present embodiment, because the distance between the center of gravity G of the battery pack 5 and the axis J (a rotation center of the spindle 11) is set to be longer than the conventional electrical power tool, i.e., the inertia moment I around the axis J is set to be larger than the conventional electrical power tool, the electrical power tool 1 is no longer likely to be swung by the reaction around the axis J that can be generated by the automatic speed change. Therefore, the user can hold the handle portion 3 with a force smaller than a conventionally required force. That is, a position of the electrical power tool 1 can be easily maintained (can be stationary maintained without being swung around the axis J). This means that the electrical power tool 1 is superior to the conventional electrical power tool in terms of usability.

An effect to prevent a swing of the electrical power tool 1 cause by torque fluctuations can be enhanced as the distance L between the axis J and the center of gravity G of the battery pack 5 is increased. Similarly, it can be enhanced as the mass M of the battery pack 5 is increased.

Further, in the 18V battery, the inertia moment I is on the order of about 20,000 ($kg \cdot mm^2$). However, for example, in a 24V battery, the inertia moment I can be set to on the order of about 40,000 ($kg \cdot mm^2$).

According to the electrical power tool 1 of the present embodiment thus constructed, the second stage internal gear 34 in the second stage planetary gear train 20 that is contained in the first to third stage planetary gear trains 20, 30 and 40 constituting the speed change device H can move between the rotation allowance position and rotation restriction position in the direction of the axis J, so that the reduction ratio can be switched in two stages, i.e., switched between the high speed low torque output condition (the high speed low torque mode) and the low speed high torque output condition (the low speed high torque mode). Because the mode switching members 39 and 39 can be displaced in the direction of the axis J in a condition in which the mode switching ring 50 is switched to the automatic speed change mode position, this two output conditions can be automatically switched based on the external torque exerted on the spindle 11. Therefore, the user can quickly progress the screw tightening operation at the high speed low torque in the initial stage of for example, the screw tightening operation, and can reliably complete the screw tightening operation at the low speed high torque without producing a so-called come-out or the incomplete tightening on or after the external torque applied to the spindle 11 (a screw tightening resistance) reaches a certain value in a latter stage of the screw tightening operation, without performing a specific switching operation.

Moreover, without performing a specific switching operation, the distance L from the axis J to the center of gravity G of the battery pack 5 and the mass M of the battery pack 5 are set adequately based on the swing force (the reaction) generated at a time of the automatic speed change. In other words, in the case of the present embodiment, the distance L from the axis J to the center of gravity G of the battery pack 5 and the mass M of the battery pack 5 are set such that the inertia moment I represented by the product of the square of the distance L and the mass M is greater than the reaction around the axis J that is produced when the high speed low torque mode is changed to the low speed high torque mode. Therefore, the electrical power tool 1 can be prevented form being rotated (being swung) around the axis J by the reaction that can be generated during the automatic speed change. Thus, the user can hold the handle portion 3 with a normal force in order to use the electrical power tool 1 while performing the automatic speed change. As a result, operability (usability) of the electrical power tool 1 can be increased. Due to increased stability of the electrical power tool 1 during the automatic speed change, an especially significant effect is provided in that a user's hand can be prevented or restricted from being unexpectedly applied with a large reaction because the user cannot precisely predict when the automatic speed change will be performed.

In addition, the reduction ratio of the speed change device H in the high speed low torque mode in which the second stage internal gear 34 is positioned in the rotation allowance position is set to provide a small output torque to an extent by which the screw tightening operation cannot be completed to the end. Conversely, the reduction ratio in the low speed high torque mode in which the second stage internal gear 34 is positioned in the rotation restriction position is set to a sufficiently high reduction ratio in which the screw tightening operation can be completed to the end without producing the incomplete tightening. Thus, the change rate of the reduction ratio before and after the automatic speed change is set to be higher than the normal rate. As a result, the reaction generated during the automatic speed change can be greater than a normal magnitude. In consideration of such a reaction, the distance L from the axis J to the center of gravity G of the battery pack 5 and the mass M of the battery pack 5 are set adequately so that the inertia moment I can be increased. As a result, the swing of the electrical power tool 1 during the automatic speed change can be prevented or significantly restrained, so that a stationary condition thereof can be maintained.

Further, members which occupy a large part of the entire mass of the electrical power tool 1 are mainly the electric motor 10, the speed change device H and the battery pack 5. The electric motor 10 and the speed change device H are disposed along the axis J. To the contrary, the battery pack 5 is disposed on a position that is most apart from the axis J (the distance L). Therefore, the mass of the electric motor 5 and the mass of the speed change device H do not significantly affect the inertia moment I about the axis J of the electrical power tool 1, and the mass M of the battery pack 5 significantly affects the inertia moment I. Therefore, the inertia moment I can be easily set by setting the mass M of the battery pack 5 and the distance L from the axis J to the center of gravity G of the battery pack 5 adequately as exemplified. This embodiment is significantly characterized in that focusing on this point, the mass M of the battery pack 5 and the distance L are adequately set, so that the stationary condition of the electrical power tool 1 can be efficiently maintained against the reaction thereof during the speed change.

Various modifications may be made to the embodiment described above. For example, the present embodiment exemplifies a structure in which the distance L from the axis J to the center of gravity G of the battery pack 5 is 195 mm, and the mass M of the battery pack 5 is 0.6 kg. However, these actual numerical values can be variously changed. For example, the same advantages can be widely obtained with the electrical power tool in which the distance L and the mass M are set such that the inertia moment I about the axis J determined by the distance L and the mass M falls within a range from approximately 20,000 to 40,000 ($kg \cdot mm^2$). That is, the distance L from the axis J to the center of gravity G of the battery pack 5 and the mass M of the battery pack 5 are increased without impairing convenience to carry and usability of the electrical power tool 1 for the users, so that the inertia moment I about the axis J of the electrical power tool 1 can be increased. Then, the electrical power tool 1 and the user's hand gripping the handle portion 3 thereof can be prevented from being swung by the reaction during the automatic speed change. Thus, the operability of the electrical power tool 1 can be increased.

Further, the screwdriver drill is exemplified as the electrical power tool 1. However, the electrical power tool 1 may be a single function machine such as an electric screwdriver for hole drilling only and an electric screw tightening machine. Further, the electrical power tool is not limited to the exemplified machine that is powered by a rechargeable battery. However, the electrical power tool may be a machine that is powered by an alternating-current source.

The invention claimed is:

1. An electrical power tool comprising:

a tool main body portion that contains an electric motor as a drive source and a speed change device for decelerating rotative power of the electric motor and outputting the same to a spindle;

a handle portion that is protruded laterally from the tool main body portion; and a battery pack as a power source that is attached to a distal end of the handle portion, wherein the speed change device is capable of changing a reduction ratio thereof and capable of automatically switching between a high speed low torque mode in which a high speed low torque is output and a low speed high torque mode in which a low speed high torque is output, based on an external torque applied to the spindle, thereby outputting the rotative power, and a distance from a rotation axis of the spindle to a center of gravity of the battery pack and a mass of the battery pack are preset such that a moment of inertia around the rotation axis of the spindle is greater than a reaction around the rotation axis of the spindle that is produced when the high speed low torque mode is changed to the low speed high torque mode in the speed change device.

2. The electrical power tool as defined in claim 1, wherein the inertia moment is set to a range from 20,000 to 40,000 ($kg \cdot mm^2$).

3. The electrical power tool as defined in claim 2, wherein an output rotation speed in the high speed low torque mode is set to 4.5 times to 6.0 times an output rotation speed in the low speed high torque mode.

* * * * *